United States Patent
Saito et al.

(10) Patent No.: US 10,196,473 B2
(45) Date of Patent: Feb. 5, 2019

(54) FLUORINE-CONTAINING DIBLOCK COPOLYMER

(71) Applicant: Unimatec Co., Ltd., Tokyo (JP)

(72) Inventors: Satoru Saito, Kitaibaraki (JP);
Katsuyuki Sato, Kitaibaraki (JP);
Takehiro Sonoi, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 15/107,677

(22) PCT Filed: Dec. 22, 2014

(86) PCT No.: PCT/JP2014/083927
§ 371 (c)(1),
(2) Date: Jun. 23, 2016

(87) PCT Pub. No.: WO2015/098850
PCT Pub. Date: Jul. 2, 2015

(65) Prior Publication Data
US 2016/0319062 A1    Nov. 3, 2016

(30) Foreign Application Priority Data

Dec. 25, 2013    (JP) .................................. 2013-267284

(51) Int. Cl.
*C08F 293/00*    (2006.01)
*C08F 220/24*    (2006.01)

(52) U.S. Cl.
CPC ........ *C08F 293/005* (2013.01); *C08F 220/24* (2013.01); *C08F 2438/01* (2013.01); *C08F 2438/03* (2013.01)

(58) Field of Classification Search
None
See application file for complete search history.

(56) References Cited

U.S. PATENT DOCUMENTS

| | | |
|---|---|---|
| 2009/0036706 A1 | 2/2009 | Murata et al. |
| 2011/0009555 A1 | 1/2011 | Kurihara et al. |
| 2014/0288231 A1 | 9/2014 | Fujita et al. |
| 2015/0004379 A1 | 1/2015 | Farnham et al. |
| 2015/0011700 A1 | 1/2015 | Farnham et al. |

FOREIGN PATENT DOCUMENTS

| | | |
|---|---|---|
| CN | 101802028 A | 8/2010 |
| JP | 2004300313 A | 10/2004 |
| JP | 200663132 A | 3/2006 |
| JP | 2008297522 A | 12/2008 |
| JP | 2009242550 A | 10/2009 |
| JP | 2010235784 A | 10/2010 |
| JP | 4674604 B2 | 2/2011 |
| WO | 2009034773 A1 | 3/2009 |
| WO | 2013058156 A1 | 4/2013 |
| WO | 2013120051 A1 | 8/2013 |
| WO | 2013120055 A1 | 8/2013 |

OTHER PUBLICATIONS

Machine translation of JP2009-242550 downloaded Mar. 17, 2017.*
Mayadunne, R.T.A. et al. Macromolecules vol. 33 pp. 243-245 (Jan. 2000).*
Cyanomethyl dodecyl trithiocarbonate product sheet downloaded from http://www.sigmaaldrich.com/catalog/product/aldrich/723029?lang=en&region=US on Sep. 16, 2017.*
Moad, Graeme et al. Material Matters vol. 5 No. 1 pp. 2-8 (2010).*
Hornung, C.H. et al. Organic Process Research & Development vol. 15 pp. 593-601 (Mar. 2011).*
Benoit et al., "Development of a Universal Alkoxyamine for "living" Free Radical Polymerizations", J. Am. Chem. Soc., 1999, pp. 3904-3920, vol. 121.
Koiry et al., "Reversible addition-fragmentation chain transfer (RAFT) polymerization of 2,2,3,3,4,4,4-heptafluorobutyl acrylate (HFBA)", Journal of Fluorine Chemistry, 2013, pp. 137-142, vol. 153.
Matyjaszewski et al., "Atom Transfer Radical Polymerization", Chem. Rev., 2001, pp. 2921-2990, vol. 101.
Moad et al., "Living Radical Polymerization by the RAFT Process", Aust. J. Chem., 2005, pp. 379-410, vol. 58.
Pan, Zuren, "3.7.4 Reversible addition-fragmentation-chain transfer free radical polymerization (RAFT)", Polymer Chemistry—Institute of Higher Education—Textbook, 2nd Edition, 2012, Press of University of Science and Technology of China.

* cited by examiner

*Primary Examiner* — Irina S Zemel
*Assistant Examiner* — Jeffrey S Lenihan
(74) *Attorney, Agent, or Firm* — The Webb Law Firm

(57) ABSTRACT

Provided is a fluorine-containing diblock copolymer having good water and oil repellency by using, as a raw material, a fluorine-containing (meth)acrylic ester having low bioaccumulation potential. The fluorine-containing diblock copolymer is produced by: process (A) a process for producing a fluorine-containing diblock copolymer by polymerizing a fluorine-containing (meth)acrylic ester represented by the following formula (1) in the presence of a trithiocarbonic ester compound and a radical polymerization initiator and then polymerizing a non-fluorine vinyl-based monomer, or process (B) a process for producing a fluorine-containing diblock copolymer by polymerizing a non-fluorine vinyl-based monomer in the presence of a trithiocarbonic ester compound and a radical polymerization initiator and then polymerizing a fluorine-containing (meth)acrylic ester represented by the following formula (1).

(1)

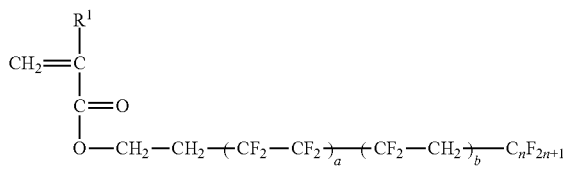

3 Claims, 3 Drawing Sheets

[Fig. 1]
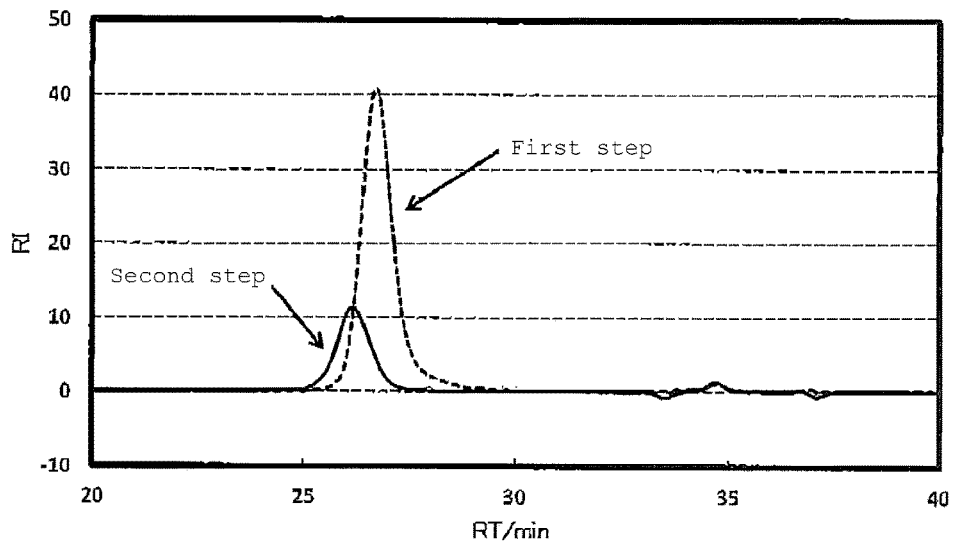
[Fig. 2]
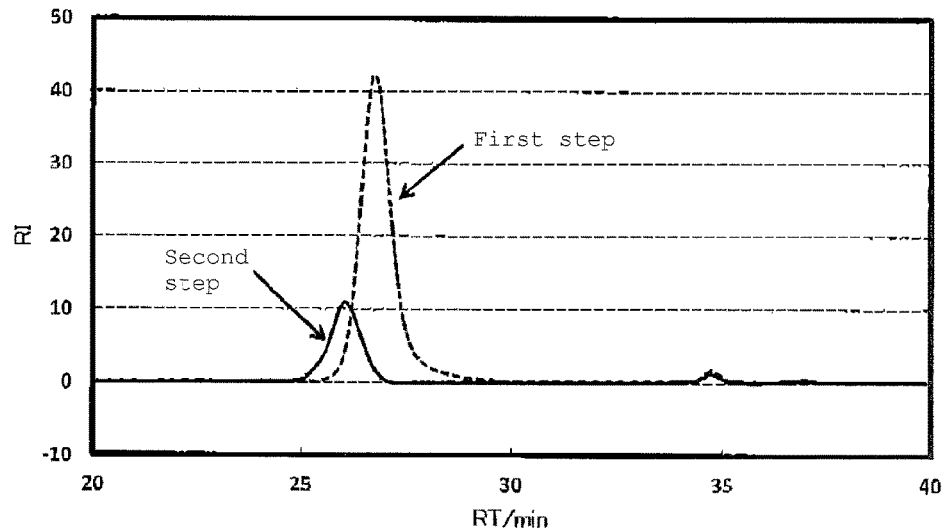

[Fig. 3]
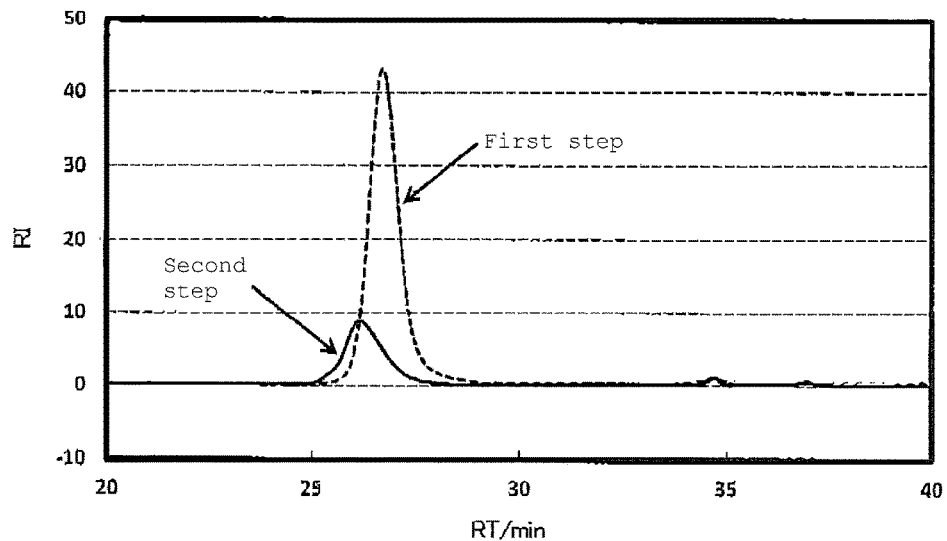
[Fig. 4]
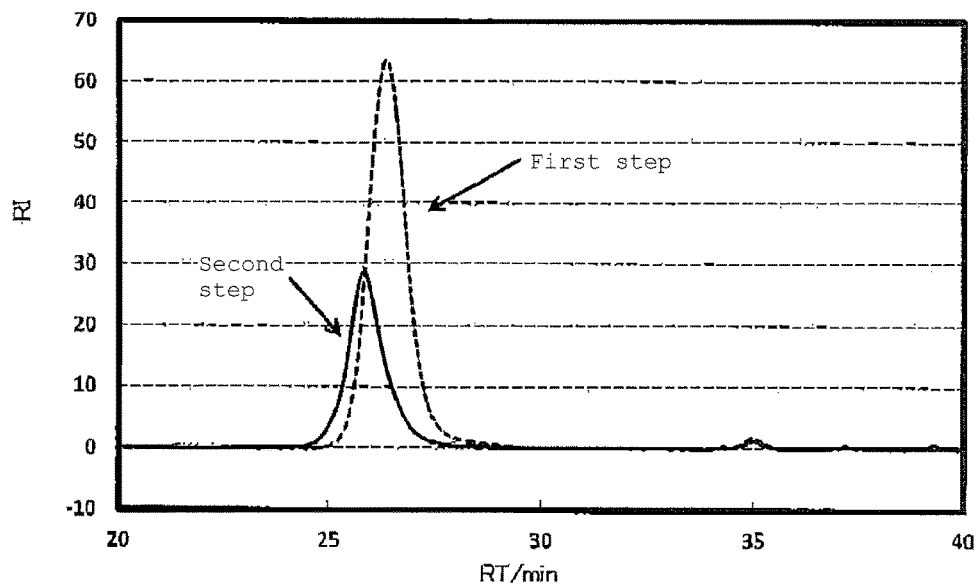

[Fig. 5]
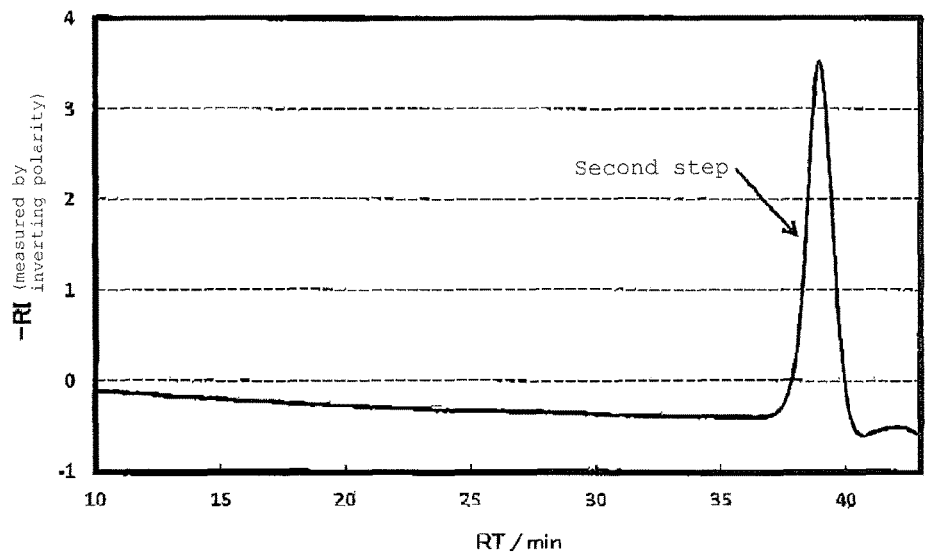
[Fig. 6]
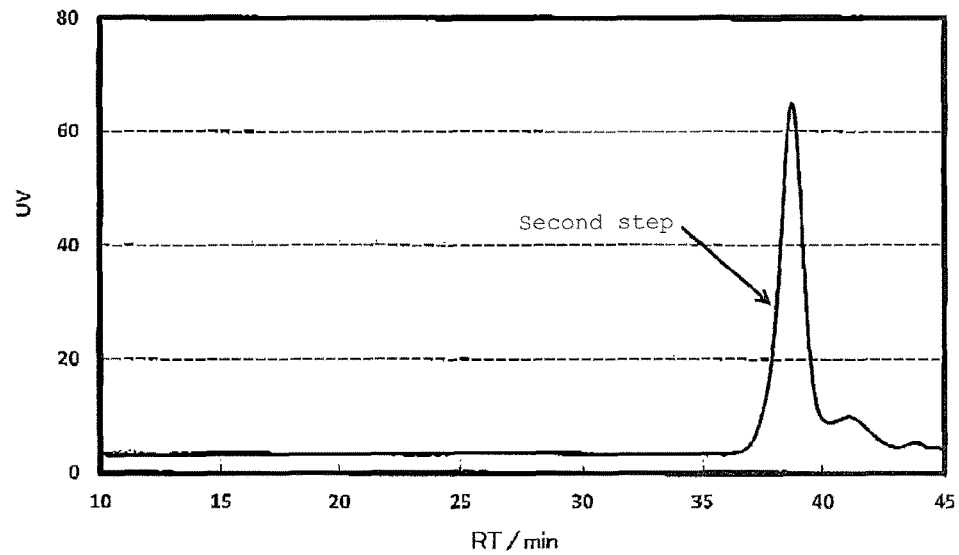

FLUORINE-CONTAINING DIBLOCK COPOLYMER

CROSS-REFERENCE TO RELATED APPLICATIONS

This application is the United States national phase of International Application No. PCT/JP2014/083927 filed Dec. 22, 2014, and claims priority to Japanese Patent Application No. 2013-267284 filed Dec. 25, 2013, the disclosures of which are hereby incorporated in their entirety by reference.

TECHNICAL FIELD

The present invention relates to a fluorine-containing diblock copolymer. More particularly, the present invention relates to a fluorine-containing diblock copolymer containing a polymer block of a fluorine-containing (meth)acrylic ester monomer having low bioaccumulation potential.

BACKGROUND ART

Fluorine-containing (meth)acrylic esters such as $CH_2=CHCO_2CH_2CH_2-Rf$ or $CH_2=C(CH_3)CO_2CH_2CH_2-Rf$ have been used in a large amount as a raw material monomer of a water and oil repellent for fibers. In recent years, however, use of the monomers having a perfluoroalkyl group (Rf) of 8 or more carbon atoms have become difficult because such monomers have high bioaccumulation potential. In order to avoid this problem, use of fluorine-containing (meth)acrylic esters having a perfluoroalkyl group of 6 or less carbon atoms have been recommended. As one example, a fluorine-containing block copolymer using a fluorine-containing (meth)acrylic ester having a perfluoroalkyl group of 6 or less carbon atoms has been reported (Patent documents 1 to 5).

However, the fluorine-containing block copolymers produced by the use of, as a raw material, a fluorine-containing (meth)acrylic ester having a perfluoroalkyl group of 6 or less carbon atoms did not exhibit satisfactory water and oil repellency in some cases.

On the other hand, with regard to block polymer production technology, precise control of molecular weight, molecular end, molecular weight distribution and molecular chain molecular arrangement has become possible with the progress of living radical polymerization technology. Particularly, controlled living radical polymerizations, such as reversible addition fragmentation chain transfer polymerization (RAFT polymerization), atom transfer radical polymerization (ATRP) or nitroxide-mediated radical polymerization (NMP), have a merit of no need for low-temperature polymerization or strict purification of monomers in anionic polymerization or the like, and a merit of a wide application range of monomers. Moreover, there is an advantage that the polymerization can be readily carried out under usual radical polymerization conditions (industrial versatility), and it has become possible to readily prepare block copolymers having various structures and functions (Non-patent Documents 1 to 3).

Among them, the Non-patent Document 1 describes that various studies of RAFT polymerization, including examination of reaction mechanism, examination of reactivity due to substituents, etc., have been made. The Non-patent Document 2 describes that various studies have also been made for ATRP. The Non-patent Document 3 describes an attempt to control polymerization of a variety of vinyl-based monomers by means of nitroxide-mediated living free radical polymerization.

CITATION LIST

Patent Literature

Patent Document 1: Japanese Patent Laid-Open Publication No. 2004-300313
Patent Document 2: Japanese Patent Laid-Open Publication No. 2006-63132
Patent Document 3: Japanese Patent Laid-Open Publication No. 2008-297522
Patent Document 4: Japanese Patent Laid-Open Publication No. 2009-242550
Patent Document 5: Japanese Patent Laid-Open Publication No. 2010-235784
Patent Document 6: Japanese Patent No. 4674604

Non Patent Literature

Non-patent Document 1: Moad, G. et al., *Aust. J. Chem.*, 2005, 58, 379-410
Non-patent Document 2: Matyjaszewski, K. et al., *Chem. Rev.*, 2001, 101, 2921-2990
Non-patent Document 3: Benoit, D. et al., *J. Am. Chem. Soc.*, 1999, 121, 3904
Non-patent Document 4: Koiry, B. P. et al., *J. Fluorine Chem.*, 2013, 153, 137-142

It is an object of the present invention to provide a fluorine-containing diblock copolymer having good water and oil repellency by using, as a raw material, a fluorine-containing (meth)acrylic ester having low bioaccumulation potential.

Solution to Problem

As a raw material monomer of a water and oil repellent having low bioaccumulation potential and having small environmental burden, a fluorine-containing (meth)acrylic ester having $-(CF_2CF_2)_a(CF_2CH_2)_b-C_nF_{2n+1}$ as a fluoroalkyl group has been reported (Patent Document 6).

The $CH_2$ group in the above formula induces dehydrofluorination reaction in the environment, and through the subsequent oxygen oxidation, the fluoroalkyl group is decomposed into a fluoroalkyl group fragment of 6 or less carbon atoms having low bioaccumulation potential.

However, there is no reported case of a fluorine-containing block copolymer containing such a fluorine-containing (meth)acrylic ester.

SUMMARY OF THE INVENTION

The present inventors have earnestly studied in the light of such circumstances as above, and as a result, they have found that a fluorine-containing diblock copolymer having a polymer of a fluorine-containing (meth)acrylic ester having $-(CF_2CF_2)_a(CF_2CH_2)_b-C_nF_{2n+1}$ as a fluoroalkyl group can be readily and efficiently produced by RAFT polymerization.

By the present invention, there is provided a fluorine-containing diblock copolymer produced by either the following process (A) or the following process (B):

Process (A)
a production process comprising
[first step] a step of polymerizing a fluorine-containing (meth)acrylic ester represented by the following formula (1) in the presence of a trithiocarbonic ester compound and a radical polymerization initiator to give a polymer of the fluorine-containing (meth)acrylic ester, and

[second step] a step of polymerizing a non-fluorine vinyl-based monomer in the presence of the polymer of the fluorine-containing (meth)acrylic ester obtained in the first step to give a fluorine-containing diblock copolymer;

Process (B)

a production process comprising

[first step] a step of polymerizing a non-fluorine vinyl-based monomer in the presence of a trithiocarbonic ester compound and a radical polymerization initiator to give a polymer of the non-fluorine vinyl-based monomer, and

[second step] a step of polymerizing a fluorine-containing (meth)acrylic ester represented by the following formula (1) in the presence of the polymer of the non-fluorine vinyl-based monomer obtained in the first step to give a fluorine-containing diblock copolymer;

[Chem. 1]

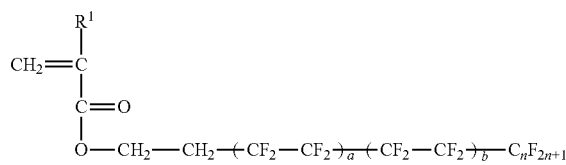

(1)

wherein $R^1$ is a hydrogen atom or a methyl group, a is an integer of 1 to 3, b is an integer of 1 to 2, n is an integer of 1 to 6, —$C_nF_{2n+1}$ group is bonded to $CH_2$ group of —$(CF_2CH_2)_b$— group, and —$(CF_2CF_2)_a$— group is bonded to $CF_2$ group of —$(CF_2CH_2)_b$— group.

The fluorine-containing diblock copolymer provided by the present invention has good water and oil repellency and can be applied to a surface treatment agent, a release agent, etc.

BRIEF DESCRIPTION OF DRAWINGS

FIG. 1 is a chart showing GPC analytical results of a fluorine-containing diblock copolymer obtained in Example 1-1.

FIG. 2 is a chart showing GPC analytical results of a fluorine-containing diblock copolymer obtained in Comparative Example 1-1.

FIG. 3 is a chart showing GPC analytical results of a fluorine-containing diblock copolymer obtained in Comparative Example 1-2.

FIG. 4 is a chart showing GPC analytical results of a fluorine-containing diblock copolymer obtained in Example 1-3.

FIG. 5 is a chart showing a GPC analytical result of a fluorine-containing diblock copolymer obtained in Example 2-1.

FIG. 6 is a chart showing a GPC analytical result of a fluorine-containing diblock copolymer obtained in Example 2-3.

DETAILED DESCRIPTION OF THE INVENTION

Embodiments of the present invention are described hereinafter.

The fluorine-containing diblock copolymer of the present invention is a fluorine-containing diblock copolymer produced by either the following process (A) or the following process (B).

In the present specification, the term "(meth)acrylic ester" is used to have a concept including both of acrylic ester and methacrylic ester. The term "non-fluorine" attached to a compound or a solvent is used to make it clear that it is not "fluorine-containing", namely, it does not contain a fluorine atom in a molecule.

[Process (A)]

First, the process (A) is described.

The process (A) used in the present invention includes the following first step and the following second step.

In order to be distinguished from a first step and a second step in the process (B) described later, the following first step and the following second step are sometimes referred to as a "process (A) first step" and a "process (A) second step", respectively.

[First Step (Process (A) First Step)]

In the process (A) used in the present invention, the first step is a step of polymerizing a fluorine-containing (meth) acrylic ester represented by the following formula (1) in the presence of a trithiocarbonic ester compound and a radical polymerization initiator to give a polymer of the fluorine-containing (meth)acrylic ester.

[Chem. 2]

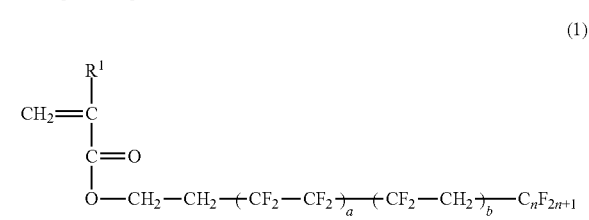

(1)

In the formula (1), $R^1$ is a hydrogen atom or a methyl group, a is an integer of 1 to 3, b is an integer of 1 to 2, n is an integer of 1 to 6, —$C_nF_{2n+1}$ group is bonded to $CH_2$ group of —$(CF_2CH_2)_b$— group, and —$(CF_2CF_2)_a$— group is bonded to $CF_2$ group of —$(CF_2CH_2)_b$— group.

In the fluorine-containing (meth)acrylic ester (1) used in the process (A) first step, $R^1$ is a hydrogen atom or a methyl group. n is an integer of 1 to 6, preferably 2 or 4. a is an integer of 1 to 3, and b is an integer of 1 to 2. In particular, a is preferably 1 or 2.

Specific examples of such fluorine-containing (meth) acrylic esters (1) include 3,3,4,4,5,5,7,7,8,8,8-undecafluorooctylacrylate, 3,3,4,4,5,5,7,7,8,8,9,9,10,10,10-pentadecafluorodecyl acrylate, 3,3,4,4,5,5,6,6,7,7,9,9,10,10,10-pentadecafluorodecyl acrylate, 3,3,4,4,5,5,7,7,9,9,10,10,10-tridecafluorodecyl acrylate, 3,3,4,4,5,5,6,6,7,7,9,9,10,10,11,11,12,12,12-nonadecafluorododecyl acrylate, 3,3,4,4,5,5,6,6,7,7,9,9,11,11,12,12,12-heptadecafluorododecyl acrylate, 3,3,4,4,5,5,7,7,9,9,10,10,11,11,12,12,12-heptadecafluorododecyl acrylate, 3,3,4,4,5,5,6,6,7,7,9,9,11,11,12,12,13,13, 14,14,14-heneicosafluorotetradecyl acrylate, 3,3,4,4,5,5,7,7, 8,8,8-undecafluorooctyl methacrylate, 3,3,4,4,5,5,7,7,8,8,9, 9,10,10,10-pentadecafluorodecyl methacrylate, 3,3,4,4,5,5, 6,6,7,7,9,9,10,10,10-pentadecafluorodecyl methacrylate, 3,3,4,4,5,5,7,7,9,9,10,10,10-tridecafluorodecyl methacrylate, 3,3,4,4,5,5,6,6,7,7,9,9,10,10,11,11,12,12,12-nonadecafluorododecyl methacrylate, 3,3,4,4,5,5,6,6,7,7,9,9,11,11, 12,12,12-heptadecafluorododecyl methacrylate, 3,3,4,4,5,5, 7,7,9,9,10,10,11,11,12,12,12-heptadecafluorododecyl methacrylate, and 3,3,4,4,5,5,6,6,7,7,9,9,11,11,12,12,13,13, 14,14,14-heneicosafluorotetradecyl methacrylate.

In particular, 3,3,4,4,5,5,6,6,7,7,9,9,10,10,11,11,12,12, 12-nonadecafluorododecyl acrylate or 3,3,4,4,5,5,6,6,7,7,9, 9,10,10,11,11,12,12,12-nonadecafluorododecyl methacrylate is preferable.

In the process (A) first step, the trithiocarbonic ester compound is used as a RAFT agent. The trithiocarbonic ester compound used in the process (A) first step is not specifically restricted, but from the viewpoints of polymerization rate and polymerization yield, a compound represented by the following formula (2) can be preferably used in the present invention.

[Chem. 3]

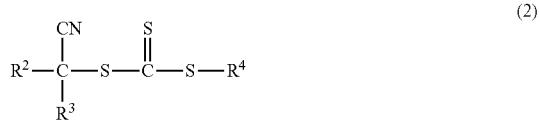

(2)

In the formula (2), R² and R³ are each independently a hydrogen atom or an alkyl group of 1 to 3 carbon atoms, and any one of R² and R³ may contain one carboxyl group. Preferred examples of R² and R³ include hydrogen atom, methyl group, ethyl group, n-propyl group, isopropyl group and 2-carboxyethyl group. R⁴ is a straight-chain alkyl group of 1 to 18 carbon atoms. When hydrolysis resistance of the trithiocarbonic ester compound is taken into consideration, a straight-chain alkyl group of 6 to 18 carbon atoms is preferable as R⁴.

Specific preferred examples of the trithiocarbonic ester compounds include 2-cyano-2-propyl dodecyl trithiocarbonate, 4-cyano-4-[(dodecylsulfanylthiocarbonyl)sulfanyl] pentanoic acid and cyanomethyl dodecyl trithiocarbonate.

Some conventional technologies are known which use, as RAFT agents, dithiobenzoate compounds, such as cumyl dithiobenzoate, 4-cyanopentanoic acid dithiobenzoate and 2-cyano-2-propyl dithiobenzoate. For example, some examples of RAFT polymerization of a fluorine-containing (meth)acrylic ester alone have been reported (see Non-patent document 4 and its cited reference). However, the fluorine-containing (meth)acrylic ester is limited to a fluorine-containing (meth)acrylic ester having a short side-chain fluoroalkyl chain, and this lacks generality as a polymerization means. Further, a polymerization test of 3,3,4,4,5,5,6, 6,7,7,8,8,8-tridecafluorooctyl acrylate at 60° C. for 16 hours using 2-cyano-2-propyl dithiobenzoate that is a compound analogous to 4-cyanopentanoic acid dithiobenzoate used in the Non-patent document 4 (this test was carried out by the present inventors) resulted in an unsatisfactory degree of polymerization of 19%. In order to avoid such a problem as in the conventional technologies, a trithiocarbonic ester compound is used as a RAFT agent in the present invention.

A standard of the amount of the trithiocarbonic ester compound used can be determined by the following formula.

$$W(RAFT) = W(FA) \times M(RAFT)/MW(PFA)$$

Here, the symbols represent the following.
W(RAFT): amount of trithiocarbonic ester used (g)
W(FA): amount of fluorine-containing (meth)acrylic ester used (g)
M(RAFT): molecular weight of trithiocarbonic ester compound (g/mol)
MW(PFA): desired molecular weight of polymer of fluorine-containing (meth)acrylic ester (g/mol)

In a preferred embodiment of the present invention, the trithiocarbonic ester compound is used usually in an amount of 0.2 to 15 wt % based on the fluorine-containing (meth) acrylic ester. The radical polymerization initiator used in the process (A) first step is not specifically restricted as long as it can smoothly promote this step without particular trouble. However, an azo-based radical polymerization initiator is preferably used. Specific examples of the azo-based radical polymerization initiators preferably used in the present invention include 2,2'-azobis(isobutyronitrile), 2,2'-azobis (2,4-dimethylvaleronitrile), 1,1'-azobis(cyclohexanecarbonitrile) and 4,4'-azobis(4-cyanovaleric acid).

The radical polymerization initiator is used in an amount of 5 to 30 mol %, based on the trithiocarbonic ester compound. The amount of the radical polymerization initiator is more preferably 10 to 20 mol %. If the amount thereof is less than 5 mol %, reduction in polymerization yield may be brought about. On the other hand, if the amount thereof is more than 30 mol %, an inert homopolymer of the fluorine-containing (meth)acrylic ester (i.e., homopolymer containing no trithiocarbonic ester compound fragment at its polymer end) tends to be readily produced. The amount of the radical polymerization initiator used depends also on reactivity of the fluorine-containing (meth)acrylic ester. Generally in the case of a fluorine-containing (meth)acrylic ester having low reactivity, the radical polymerization initiator is used in a large amount. On the other hand, when the reactivity is high, the radical polymerization initiator is used in a small amount.

Polymerization of the fluorine-containing (meth)acrylic ester can be carried out without a solvent (bulk polymerization) or in an appropriate organic solvent. As the solvent used in the polymerization reaction, a fluorine-containing solvent such as 1,3-bis(trifluoromethyl)benzene is preferable. The fluorine-containing solvent is used in an amount of 0 to 300 wt %, more preferably 0 to 200 wt %, based on the fluorine-containing (meth)acrylic ester. If the amount of the solvent is more than 300 wt %, lowering of polymerization rate and reduction in polymerization yield may be brought about.

Polymerization of the fluorine-containing (meth)acrylic ester is carried out at 0 to 150° C., preferably 40 to 100° C. In more detail, polymerization of the fluorine-containing acrylic ester is preferably carried out at 40 to 80° C., and polymerization of the fluorine-containing methacrylic ester is preferably carried out at 60 to 100° C. If the polymerization temperature is lower than 0° C., a sufficient polymerization rate is not attained, and this sometimes leads to reduction in polymerization yield. On the other hand, if the temperature exceeds 150° C., an inert homopolymer of the fluorine-containing (meth)acrylic ester (i.e., homopolymer containing no trithiocarbonic ester compound fragment at its polymer end) tends to be readily produced.

A reaction container for use in the polymerization of the fluorine-containing (meth)acrylic ester in the presence of the trithiocarbonic ester compound and the radical polymerization initiator is not specifically restricted as long as it does not cause any troubles in polymerization reaction, such as decomposition of the trithiocarbonic ester compound and termination of the polymerization reaction. However, a borosilicate glass reaction container is preferable. As the borosilicate glass reaction container employable in the present invention, a borosilicate glass reaction container that is generically available in the market may be used in some cases, but the trithiocarbonic ester compound may be decomposed during the course of the polymerization reaction to thereby terminate the polymerization reaction, and hence a high polymerization yield tends to be unable to be stably attained frequently.

For the above reason, borosilicate tempered glass is recommended as a material of the reaction container used for carrying out the polymerization reaction in the present invention. The borosilicate tempered glass is produced by subjecting borosilicate glass to air-cooling tempering.

Although factors are not clear which enable polymerization of the fluorine (meth)acrylic ester in the first step readily and efficiently carried out by the use of a borosilicate tempered glass reaction container, it is presumed that the container surface probably has a structure chemically or physically inert to the trithiocarbonic ester compound.

Specific examples of preferred reaction containers include Hiper Glass (registered trademark) cylinders manufactured by Taiatsu Techno Corporation. For example, HPG-10, HPG-96, TEM-U1000N, TEM-V-100, TEM-V-200, TEM-V-300, TEM-V-500, TEM-4-B1-2L and TEM-4-B1-4L (all manufactured by Taiatsu Techno Corporation) can be mentioned.

It is confirmed by the present inventors that not only the borosilicate tempered glass reaction container but also a stainless steel reaction container can be preferably used as the reaction container employable for the polymerization reaction in the present invention.

Therefore, it is preferable to carry out the polymerization reaction in a borosilicate tempered glass reaction container or a stainless steel reaction container in the present invention.

Specific examples of the polymers of the fluorine-containing (meth)acrylic ester obtained in the process (A) first step in the present invention include the following polymers (in the following formulas, k is an appropriate integer that is not 0).

[Chem. 4-1]

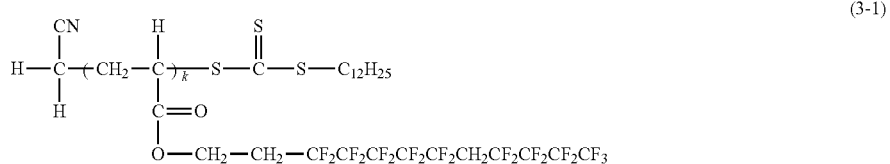

(3-1)

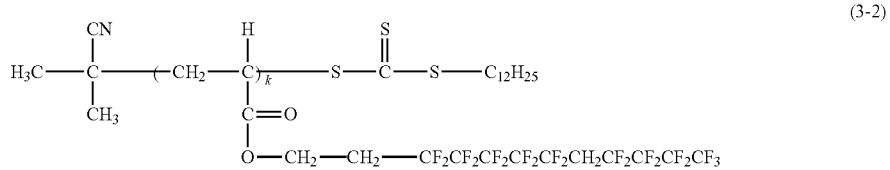

(3-2)

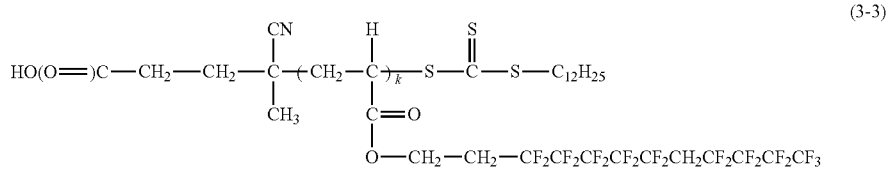

(3-3)

[Chem. 4-2]

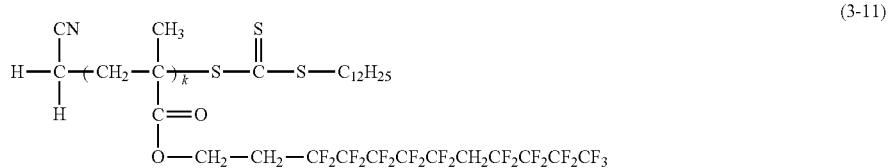

(3-11)

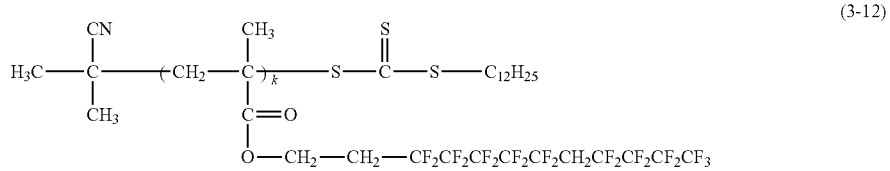

(3-12)

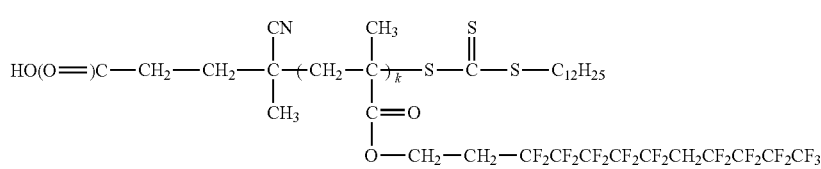

(3-13)

In the present invention, the polymer of the fluorine-containing (meth)acrylic ester obtained in the process (A) first step has a number-average molecular weight of the polymer of, although not specifically restricted, usually 2,000 to 100,000 when production cost and productivity are taken into consideration. The number-average molecular weight referred to herein is a molecular weight determined by $^1$H-NMR. A specific method for calculating the number-average molecular weight will be described later.

[Second Step (Process (A) Second Step)]

In the production process of the process (A) used in the present invention, the second step is a step of polymerizing a non-fluorine vinyl-based monomer in the presence of the polymer of the fluorine-containing (meth)acrylic ester obtained in the process (A) first step.

This second step can be specifically carried out by either the following method I or the following method II:

method I: a method comprising adding, to the polymer solution obtained in the process (A) first step, a non-fluorine vinyl-based monomer, and if necessary, a fluorine-containing solvent, a non-fluorine solvent and a radical polymerization initiator, and carrying out polymerization;

method II: a method comprising isolating the polymer of the fluorine-containing (meth)acrylic ester produced in the process (A) first step, then adding, to the polymer, a non-fluorine vinyl-based monomer, a fluorine-containing solvent, a non-fluorine solvent and a radical polymerization initiator, and carrying out polymerization.

As the non-fluorine vinyl-based monomer for use in the process (A) second step, a monomer that undergoes block polymerization with the polymer of the fluorine-containing (meth)acrylic ester obtained in the first step is used. As a preferred non-fluorine vinyl-based monomer, at least one compound is selected specifically from a non-fluorine (meth)acrylic ester, a non-fluorine aromatic vinyl compound, etc.

Examples of the non-fluorine (meth)acrylic ester compounds include methyl acrylate, ethyl acrylate, propyl acrylate, butyl acrylate, t-butyl acrylate, hexyl acrylate, octyl acrylate, dodecyl acrylate, hexadecyl acrylate, octadecyl acrylate, benzyl acrylate, methyl methacrylate, ethyl methacrylate, propyl methacrylate, butyl methacrylate, t-butyl methacrylate, hexyl methacrylate, octyl methacrylate, dodecyl methacrylate, hexadecyl methacrylate, octadecyl methacrylate and benzyl methacrylate.

Examples of the non-fluorine aromatic vinyl compounds include styrene, 4-methylstyrene and 4-t-butylstyrene.

The solvent for use in the process A second step is properly selected taking into consideration solubility of the polymer of the fluorine-containing (meth)acrylic ester obtained in the first step and the non-fluorine vinyl-based monomer. For example, a fluorine-containing solvent, a non-fluorine solvent or a mixture of a fluorine-containing solvent and a non-fluorine solvent is used. Examples of the fluorine-containing solvents include 1,3-bis(trifluoromethyl)benzene. Examples of the non-fluorine solvents include toluene, xylene, methyl ethyl ketone and ethyl acetate.

In the method I, when needed, the above solvent is freshly added to the polymer solution obtained in the first step.

In the method II, the above solvent is added to the polymer of the fluorine-containing (meth)acrylic ester obtained in the first step.

The amount of the solvent used is preferably 50 to 300 wt % based on the total of the weight of the polymer of the fluorine-containing (meth)acrylic ester obtained in the first step and the weight of the non-fluorine vinyl-based monomer added in the second step. If the amount of the solvent is less than 50 wt %, the viscosity of the reaction solution increases with the progress of the polymerization, and therefore, stirring and mixing may be difficult. If the amount thereof exceeds 300 wt %, the polymerization rate is slowed down and is not practical in some cases.

Polymerization of the non-fluorine vinyl-based monomer is carried out at 0 to 150° C., preferably 40 to 120° C. In more detail, polymerization of the non-fluorine acrylic ester is preferably carried out at 40 to 80° C., polymerization of the non-fluorine methacrylic ester is preferably carried out at 60 to 100° C., and polymerization of the non-fluorine aromatic vinyl-based monomer is preferably carried out at 60 to 120° C. If the polymerization temperature is lower than 0° C., a sufficient polymerization rate may not be attained, and this may lead to reduction in polymerization yield. On the other hand, if the polymerization temperature exceeds 150° C., undesired chain transfer reaction, etc. may occur.

In the process (A) second step, when needed, a radical polymerization initiator is freshly added to carry out the polymerization.

As the radical polymerization initiator for use in the process (A) second step, the same one as the azo-based radical polymerization initiator used in the process (A) first step can be used, and such radical polymerization initiators specifically include 2,2'-azobis(isobutyronitrile), 2,2'-azobis(2,4-dimethylvaleronitrile), 1,1'-azobis(cyclohexanecarbonitrile), 4,4'-azobis(4-cyanovaleric acid), etc.

In a preferred embodiment of the present invention, the radial polymerization initiator is used usually in an amount of 5 to 35 mol %, more preferably 10 to 30 mol %, based on the fragments of the trithiocarbonic ester compound contained in the polymer of the fluorine-containing (meth)acrylic ester obtained in the first step. If the amount of the radical polymerization initiator is less than 5 mol %, reduction in polymerization yield may be brought about. On the other hand, if the amount thereof is more than 30 mol %, a homopolymer of the non-fluorine vinyl-based monomer tends to be readily by-produced. A rough standard of the amount of the radical polymerization initiator used is 10 to 15 mol % in the case of the non-fluorine acrylic ester, and is 15 to 30 mol % in the case of the non-fluorine methacrylic ester or the non-fluorine aromatic vinyl compound.

As a reaction container for use in the process (A) second step, a borosilicate glass reaction container is preferable.

Further, reaction containers that may be used also include a borosilicate tempered glass reaction container and a stainless steel reaction container.

[Process (B)]

Next, the process (B) is described.

The process (B) used in the present invention includes the following first step and the following second step.

In order to distinguish the aforesaid "process (A) first step" and "process (A) second step", the following first step and the following second step are sometimes referred to as a "process (B) first step" and a "process (B) second step", respectively.

[First Step (Process (B) First Step)]

In the process (B) used in the present invention, the first step is a step of polymerizing a non-fluorine vinyl-based monomer in the presence of a trithiocarbonic ester compound and a radical polymerization initiator to give a polymer of the non-fluorine vinyl-based monomer.

As the non-fluorine vinyl-based monomer for use in the process (B) first step, at least one compound is selected from a non-fluorine (meth)acrylic ester, a non-fluorine aromatic vinyl compound, etc.

The non-fluorine vinyl-based monomer employable in the process (B) first step is the same as the non-fluorine vinyl-based monomer mentioned in the process (A) second step.

Specific examples of the non-fluorine (meth)acrylic esters include methyl acrylate, ethyl acrylate, propyl acrylate, butyl acrylate, t-butyl acrylate, hexyl acrylate, octyl acrylate, dodecyl acrylate, hexadecyl acrylate, octadecyl acrylate, benzyl acrylate, methyl methacrylate, ethyl methacrylate, propyl methacrylate, butyl methacrylate, t-butyl methacrylate, hexyl methacrylate, octyl methacrylate, dodecyl methacrylate, hexadecyl methacrylate, octadecyl methacrylate and benzyl methacrylate.

Examples of the non-fluorine aromatic vinyl compounds include styrene, 4-methylstyrene and 4-t-butylstyrene.

The trithiocarbonic ester compound employable in the process (B) first step is the same as the trithiocarbonic ester compound mentioned in the process (A) first step, and similarly to the case of the process (A) first step, the aforesaid compound represented by the formula (2) can be preferably used.

Specific examples of the trithiocarbonic ester compounds include 2-cyano-2-propyl dodecyl trithiocarbonate, 4-cyano-4-[(dodecylsulfanylthiocarbonyl)sulfanyl]pentanoic acid and cyanomethyl dodecyl trithiocarbonate.

A standard of the amount of the trithiocarbonic ester compound used can be determined by the following formula.

$$W(RAFT) = W(A) \times M(RAFT)/MW(PA)$$

Here, the symbols represent the following.

W(RAFT): amount of trithiocarbonic ester used (g)

W(A): amount of non-fluorine vinyl-based monomer used (g)

M(RAFT): molecular weight of trithiocarbonic ester compound (g/mol)

MW(PA): desired molecular weight of polymer of non-fluorine vinyl-based monomer (g/mol)

In a preferred embodiment of the present invention, the trithiocarbonic ester compound is used usually in an amount of 0.2 to 40 wt % based on the non-fluorine vinyl-based monomer.

A solvent for use in the process (B) first step is properly selected taking into consideration solubility of the non-fluorine vinyl-based monomer and solubility of a polymer thereof. For example, a fluorine-containing solvent, a non-fluorine solvent or a mixture of non-fluorine solvents can be used, but it is preferable to use a non-fluorine solvent alone. Examples of the fluorine-containing solvents include 1,3-bis(trifluoromethyl)benzene. Examples of the non-fluorine solvents include toluene, xylene, methyl ethyl ketone and ethyl acetate.

The amount of the solvent used is 0 to 300 wt %, more preferably 0 to 200 wt %, based on the non-fluorine vinyl-based monomer. If the amount of the solvent is not less than 300 wt %, the polymerization rate may be slowed down and be not practical.

Polymerization of the non-fluorine vinyl-based monomer is carried out at 0 to 150° C., preferably 40 to 120° C. In more detail, polymerization of the non-fluorine acrylic ester is preferably carried out at 40 to 80° C., polymerization of the non-fluorine methacrylic ester is preferably carried out at 60 to 100° C., and polymerization of the non-fluorine aromatic vinyl-based monomer is preferably carried out at 60 to 120° C. If the polymerization temperature is lower than 0° C., a sufficient polymerization rate may not be attained, and this may lead to reduction in polymerization yield. On the other hand, if the polymerization temperature exceeds 150° C., undesired chain transfer reaction, etc. may occur.

As the radical polymerization initiator employable in the process (B) first step, the same one as the radical polymerization initiator used in the process (A) first step can be mentioned.

Examples of such radical polymerization initiators used include 2,2'-azobis(isobutyronitrile), 2,2'-azobis(2,4-dimethylvaleronitrile), 1,1'-azobis(cyclohexanecarbonitrile), 4,4'-azobis(4-cyanovaleric acid), etc. The radial polymerization initiator is used in an amount of 5 to 35 mol %, more preferably 10 to 30 mol %, based on the trithiocarbonic ester compound. If the amount of the radical polymerization initiator is less than 5 mol %, reduction in polymerization yield may be brought about. On the other hand, if the amount thereof is more than 35 mol %, an inert homopolymer of the non-fluorine vinyl-based monomer (i.e., homopolymer containing no trithiocarbonic ester compound fragment at its polymer end) tends to be readily by-produced. A rough standard of the amount of the radical polymerization initiator used is 10 to 15 mol % in the case of the non-fluorine acrylic ester, and is 15 to 30 mol % in the case of the non-fluorine methacrylic ester and in the case of the non-fluorine aromatic vinyl compound.

As a reaction container for use in the process (B) first step, a borosilicate glass reaction container is preferable. Further, reaction containers that may be used also include a borosilicate tempered glass reaction container and a stainless steel reaction container.

The polymer of the non-fluorine vinyl-based monomer obtained in the process (B) first step has a number-average molecular weight of, although not specifically restricted, usually 1,000 to 100,000 when production cost and productivity are taken into consideration. The number-average molecular weight referred to herein is a molecular weight determined by $^1$H-NMR. A specific method for calculating the number-average molecular weight will be described later.

[Second Step (Process (B) Second Step)]

In the process (B) used in the present invention, the second step is a step of polymerizing a fluorine-containing (meth)acrylic ester represented by the following formula (1) in the presence of the polymer of the non-fluorine vinyl-based monomer obtained in the process (B) first step to give a fluorine-containing diblock copolymer.

[Chem. 5]

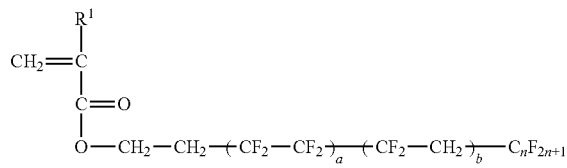

(1)

In the formula (1), $R^1$ is a hydrogen atom or a methyl group, a is an integer of 1 to 3, b is an integer of 1 to 2, n is an integer of 1 to 6, —$C_nF_{2n+1}$ group is bonded to $CH_2$ group of —($CF_2$ $CH_2$)$_b$— group, and —($CF_2CF_2$)$_a$— group is bonded to $CF_2$ group of —($CF_2CH_2$)$_b$— group.

As a specific fluorine-containing (meth)acrylic ester (1) employable in the process (B) second step, the same one as the fluorine-containing (meth)acrylic ester (1) used in the aforesaid process (A) first step can be mentioned.

Specific examples of such fluorine-containing (meth)acrylic esters (1) include 3,3,4,4,5,5,7,7,8,8,8-undecafluorooctyl acrylate, 3,3,4,4,5,5,7,7,8,8,9,9,10,10,10-pentadecafluorodecyl acrylate, 3,3,4,4,5,5,6,6,7,7,9,9,10,10,10-pentadecafluorodecyl acrylate, 3,3,4,4,5,5,7,7,9,9,10,10,10-tridecafluorodecyl acrylate, 3,3,4,4,5,5,6,6,7,7,9,9,10,10,11,11,12,12,12-nonadecafluorododecyl acrylate, 3,3,4,4,5,5,6,6,7,7,9,9,11,11,12,12,12-heptadecafluorododecyl acrylate, 3,3,4,4,5,5,7,7,9,9,10,10,11,11,12,12,12-heptadecafluorododecyl acrylate, 3,3,4,4,5,5,6,6,7,7,9,9,11,11,12,12,13,13,14,14,14-heneicosafluorotetradecyl acrylate, 3,3,4,4,5,5,7,7,8,8,8-undecafluorooctyl methacrylate, 3,3,4,4,5,5,7,7,8,8,9,9,10,10,10-pentadecafluorodecyl methacrylate, 3,3,4,4,5,5,6,6,7,7,9,9,10,10,10-pentadecafluorodecyl methacrylate, 3,3,4,4,5,5,7,7,9,9,10,10,10-tridecafluorodecyl methacrylate, 3,3,4,4,5,5,6,6,7,7,9,9,10,10,11,11,12,12,12-nonadecafluorododecyl methacrylate, 3,3,4,4,5,5,6,6,7,7,9,9,11,11,12,12,12-heptadecafluorododecyl methacrylate, 3,3,4,4,5,5,7,7,9,9,10,10,11,11,12,12,12-heptadecafluorododecyl methacrylate, and 3,3,4,4,5,5,6,6,7,7,9,9,11,11,12,12,13,13,14,14,14-heneicosafluorotetradecyl methacrylate.

In particular, 3,3,4,4,5,5,6,6,7,7,9,9,10,10,11,11,12,12,12-nonadecafluorododecyl acrylate or 3,3,4,4,5,5,6,6,7,7,9,9,10,10,11,11,12,12,12-nonadecafluorododecyl methacrylate is preferable.

In the present invention, the process (B) second step can be carried out by either the following method I or the following method II:

method I: a method comprising adding, to the polymer solution obtained in the process (B) first step, a fluorine-containing (meth)acrylic ester, and if necessary, a fluorine-containing solvent, a non-fluorine solvent or a mixture thereof, and a radical polymerization initiator, and carrying out polymerization;

method II: a method comprising isolating the polymer of the non-fluorine vinyl-based monomer produced in the process (B) first step, then adding, to the polymer, a fluorine-containing (meth)acrylic ester, a fluorine-containing solvent, a non-fluorine solvent or a mixture thereof, and a radical polymerization initiator, and carrying out polymerization.

As the radical polymerization initiator that is used in the process (B) second step when needed, an azo-based radical polymerization initiator is preferably used. Specific examples of the azo-based radical polymerization initiators include 2,2'-azobis(isobutyronitrile), 2,2'-azobis(2,4-dimethylvaleronitrile), 1,1'-azobis(cyclohexanecarbonitrile) and 4,4'-azobis(4-cyanovaleric acid).

The radial polymerization initiator is used usually in an amount of 5 to 35 mol %, more preferably 10 to 30 mol %, based on the fragments of the trithiocarbonic ester compound contained in the polymer of the non-fluorine vinyl-based monomer obtained in the first step. If the amount of the radical polymerization initiator is less than 5 mol %, reduction in polymerization yield may be brought about. On the other hand, if the amount thereof is more than 30 mol %, a homopolymer of a fluorine-containing vinyl-based monomer tends to be readily by-produced. A rough standard of the amount of the radical polymerization initiator used is 10 to 15 mol % in the case where the non-fluorine vinyl-based monomer is a non-fluorine acrylic ester, and is 15 to 30 mol % in the case where the non-fluorine vinyl-based monomer is a non-fluorine methacrylic ester or a non-fluorine aromatic vinyl compound.

A solvent for use in the process (B) second step is properly selected taking into consideration solubility of the polymer of the non-fluorine vinyl-based monomer obtained in the process (B) first step and the fluorine-containing (meth)acrylic ester. For example, a fluorine-containing solvent, a non-fluorine solvent or a mixture of a fluorine-containing solvent and a non-fluorine solvent is used. Examples of the fluorine-containing solvents include 1,3-bis(trifluoromethyl)benzene. Examples of the non-fluorine solvents include toluene, xylene, methyl ethyl ketone and ethyl acetate.

In the method I, when needed, the above solvent is freshly added to the polymer solution obtained in the process (B) first step.

In the method II, the above solvent is added to the polymer of the non-fluorine vinyl-based monomer obtained in the process (B) first step.

The amount of the solvent used is preferably 50 to 300 wt % based on the total of the weight of the polymer of the non-fluorine vinyl-based monomer obtained in the process (B) first step and the weight of the fluorine-containing (meth)acrylic ester added in the process (B) second step. If the amount of the solvent is less than 50 wt %, the viscosity of the reaction solution increases with the progress of the polymerization, and stirring and mixing may be difficult. On the other hand, if the amount thereof exceeds 300 wt %, the polymerization rate is slowed down and is not practical in some cases.

Polymerization of the fluorine-containing (meth)acrylic ester is carried out at 0 to 150° C., preferably 40 to 120° C. In more detail, polymerization of the fluorine-containing acrylic ester is preferably carried out at 40 to 80° C., and polymerization of the fluorine-containing methacrylic ester is preferably carried out at 60 to 100° C. If the polymerization temperature is lower than 0° C., a sufficient polymerization rate may not be attained, and this may lead to reduction in polymerization yield. On the other hand, if the polymerization temperature exceeds 150° C., undesired chain transfer reaction, etc. may occur.

As a reaction container for use in the process (B) second step, a borosilicate glass reaction container or a borosilicate tempered glass reaction container is recommended. The borosilicate tempered glass is produced by subjecting the borosilicate glass to air-cooling tempering. A stainless steel reaction container can be also used.

The fluorine-containing diblock copolymer produced by the present invention is constituted of one polymer block of fluorine-containing (meth)acrylic ester and one polymer block of non-fluorine vinyl-based monomer even if the copolymer is obtained by any of the aforesaid process (A) and process (B).

The fluorine-containing diblock copolymer that can be produced by the present invention has composition of 1 to 99 mol % of a polymer block of the fluorine-containing (meth)acrylic ester and 99 to 1 mol % of a polymer block of the non-fluorine vinyl-based monomer. Here, the term "mol %" used for each polymer block constituting the fluorine-containing diblock copolymer means "mol %" of each constituent unit constituting the fluorine-containing diblock copolymer. For example, a case where a certain fluorine-containing diblock copolymer is constituted of 40 mol % of a polymer block of the fluorine-containing (meth)acrylic ester and 60 mol % of a polymer block of the non-fluorine vinyl-based monomer means that the fluorine-containing diblock copolymer is constituted of 40 mol % of a constituent unit corresponding to the fluorine-containing (meth)acrylic ester and 60 mol % of a constituent unit corresponding to the non-fluorine vinyl-based monomer.

The fluorine-containing diblock copolymer that can be produced by the present invention usually has a number-average molecular weight of 3,000 to 300,000, preferably 5,000 to 200,000. The number-average molecular weight referred to herein is a molecular weight determined by $^1$H-NMR.

A method for calculating the number-average molecular weight of the fluorine-containing diblock copolymer produced by the present invention is not specifically restricted, but for example, the number-average molecular weight can be determined on the basis of a ratio of an integrated value of H peaks derived from the fluorine-containing (meth)acrylic ester to an integrated value of H peaks derived from the trithiocarbonic ester compound and a ratio of an integrated value of H peaks derived from the non-fluorine vinyl-based monomer to an integrated value of H peaks derived from the trithiocarbonic ester compound.

Here, when the molecular weight of a compound represented by the trichiocarbonic ester compound is denoted by $M_1$, the molecular weight of the fluorine-containing (meth)acrylic ester is denoted by $M_2$, the molecular weight of the non-fluorine vinyl-based monomer is denoted by $M_3$, the integrated value of appropriate H peaks characteristic of the compound represented by the trithiocarbonic ester compound and the number of H corresponding to those peaks are denoted by $I_1$ and $N_1$, respectively, the integrated value of appropriate H peaks characteristic of the fluorine-containing (meth)acrylic ester and the number of H corresponding to those peaks are denoted by $I_2$ and $N_2$, respectively, and the integrated value of appropriate H peaks characteristic of the non-fluorine vinyl-based monomer and the number of H corresponding to those peaks are denoted by $I_3$ and $N_3$, respectively, the number-average molecular weight Mn' can be determined by the following formula:

$$Mn'=M_1+[M_2\times(I_2/N_2)/(I_1/N_1)]+[M_3\times(I_3/N_3)/(I_1/N_1)]$$

In the present invention, however, Mn determined by the following formula on the basis of the below-described examples may be regarded as a number-average molecular weight for convenience.

$$Mn=[M_2\times(I_2/N_2)/(I_1/N_1)]+[M_3\times(I_3/N_3)/(I_1/N_1)]$$

The number-average molecular weights of the polymer of the fluorine-containing (meth)acrylic ester obtained in the process (A) first step and the polymer of the non-fluorine vinyl-based monomer obtained in the process (B) first step can be also determined in the same way as above.

Also the amounts "mol %" of a polymer block of the fluorine-containing (meth)acrylic ester and a polymer block of the non-fluorine vinyl-based monomer can be calculated on the basis of an integrated value of appropriate H peaks characteristic of the fluorine-containing (meth)acrylic ester and an integrated value of appropriate H peaks characteristic of the non-fluorine vinyl-based monomer.

By the present invention, a fluorine-containing diblock copolymer can be readily and efficiently produced. In particular, the production process of the present invention has a wide application range of non-fluorine vinyl-based monomers and can be applied to production of surface active agents having good static water and oil repellency and dynamic water and oil repellency.

EXAMPLES

Next, the present invention is described with reference to the following examples.

[GPC Analysis]
Column: Shodex (registered trademark) KF-807L (available from Showa Denko K.K.)×4
Measurement temperature: 40° C.
Sample injection quantity: 100 μl
Flow rate: 1 ml/min
Eluent: tetrahydrofuran

[Molecular Weight Measurement]
Number-average molecular weight of a fluorine-containing block copolymer was determined by $^1$H-NMR.
Apparatus: JEOL JNM-LA300 (JEOL Ltd.)
Solvent: chloroform-d
Chemical shift: $^1$H is based on TMS. $^{19}$F is based on $CFCl_3$.

[Degree of Polymerization]
Degree of Polymerization=solids concentration of polymer solution (measured value)/solids concentration given on the assumption that the degree of polymerization is 100% (calculated value)

[Water and Oil Repellency]
A 6 wt % tetrahydrofuran solution of a block copolymer was applied to a surface of a SUS304 plate (0.8*15*50 mm) by the use of a spin coater and dried. Thereafter, a static contact angle and a dynamic contact angle were measured by the use of a Drop Master DM500 (manufactured by Kyowa Interface Science Co., Ltd.).

Abbreviations of chemical products used in the examples are shown below.

AIBN: 2,2'-azobis(isobutyronitrile) [available from Wako Pure Chemical Industries, Ltd.]
V-65: 2,2'-azobis(2,4-dimethylvaleronitrile) [available from Wako Pure Chemical Industries, Ltd.]
MTF: 1,3-bis(trifluoromethyl)benzene
CDSTSP: 4-cyano-4-[(dodecylsulfanylthiocarbonyl)sufanyl]pentanoic acid (available from Aldrich; its structural formula is shown below.)

[Chem. 6]

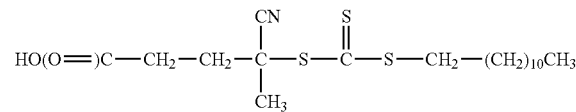

FAAC4: 3,3,4,4,5,5,6,6,6-nonafluorohexyl acrylate
FAAC6: 3,3,4,4,5,5,6,6,7,7,8,8,8-tridecafluorooctyl acrylate
FAAC10(2H): 3,3,4,4,5,5,6,6,7,7,9,9,10,10,11,11,12,12,12-nonadecafluorododecyl acrylate
MMA: methyl methacrylate
BzMA: benzyl methacrylate BA: n-butyl acrylate
LA: n-dodecyl acrylate
SA: n-octadecyl acrylate
St: styrene Example 1-1

In a borosilicate glass container having an internal volume of 300 ml, a magnetic stirrer, 30 g of MMA, 0.56 g of CDSTSP, 45.7 mg of AIBN and 20 g of toluene were placed. The reaction container was immersed in liquid nitrogen to allow its contents to freeze, and thereafter, the container was degassed for 5 minutes by means of an oil-sealed rotary vacuum pump. After the stopcock was closed, the container was immersed in an oil bath at 85° C. After 10 hours, the reaction container was cooled down to room temperature, and the pressure in the container was released to atmospheric pressure to give a solution of a polymer of a non-fluorine vinyl-based monomer (referred to as a "polymer solution B1-1" hereinafter). From the solids concentration of the polymer solution, the degree of polymerization proved to be 97%.

(Second Step: Polymerization of FAAC10(2H))
To the polymer solution B1-1 in the reaction container, 40.0 g of FAAC10(2H), 35 mg of V-65 and 40.0 g of toluene were added. The reaction container was immersed in liquid nitrogen to allow its contents to freeze, and thereafter, the container was degassed for 5 minutes by means of an oil-sealed rotary vacuum pump. After the stop valve was closed, the container was immersed in an oil bath at 60° C. for 10 hours. The reaction container was cooled down to room temperature, and the pressure in the container was released to atmospheric pressure to give a polymer solution (referred to as a "polymer solution B1-2" hereinafter). From the solids concentration of the contents, the total degree of polymerization of the process including the first step proved to be 94%.

The resulting polymer solution B1-2 was added dropwise to methanol to allow a copolymer to reprecipitate. Subsequently, the solid matter was vacuum dried at 80° C. for 5 hours to remove a volatile component. The resulting copolymer was analyzed by GPC, and as a result, a unimodal peak was observed. From this result, the resulting copolymer was confirmed to be a diblock copolymer constituted of a MMA polymer block and a FAAC10 (2H) polymer block (see FIG. 1). Further, by means of $^1$H-NMR analysis, a molecular weight and composition of the fluorine-containing block copolymer were determined.

[Calculation was carried out using a ratio between a 4.3 ppm peak (FAAC10 (2H) polymer block) integrated value and a 4.0 ppm peak (MMA polymer block) integrated value. Further, a number-average molecular weight was calculated using a peak (—S—C(=S)—S—CH$_2$—C$_{11}$H$_{23}$) observed in the vicinity of 3.0 to 3.4 ppm and the above peak integrated value ratio.]

Example 1-2

(First Step: Polymerization of MMA)
In a Hiper Glass (registered trademark) cylinder having an internal volume of 96 ml (HPG-96, manufactured by Taiatsu Techno Corporation), a magnetic stirrer, 1.5 g of MMA, 20 mg of CDSTSP, 1.7 mg of AIBN and 1.0 g of toluene were placed. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 85° C. After 10 hours, the cylinder was cooled down to room temperature, and the pressure in the cylinder was released to atmospheric pressure to give a solution of a polymer of a non-fluorine vinyl-based monomer (referred to as a "polymer solution B2-1" hereinafter). From the solids concentration of the contents, the degree of polymerization proved to be 96%.

(Second Step: Polymerization of FAAC10(2H))
To the polymer solution B2-1 in the cylinder, 3.5 g of FAAC10 (2H), 1.3 mg of V-65 and 6.5 g of toluene were added. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. for 10 hours. The cylinder was cooled down to room temperature, and the pressure in the cylinder was released to atmospheric pressure. From the solids concentration of the contents, the total degree of polymerization of the process including the first step proved to be 91%.

Example 1-3

(First Step: Polymerization of BzMA)
Polymerization was carried out in the same manner as in the first step of Example 1-2, except that 3.0 g of BzMA, 24 mg of CDSTSP, 2.0 mg of AIBN and 3.0 g of toluene were placed. The degree of polymerization was 92%.

The solution of a polymer of a non-fluorine vinyl-based monomer obtained herein is referred to as a "polymer solution B3-1" hereinafter.

(Second Step: Polymerization of FAAC10 (2H))
A polymer solution (referred to as a "polymer solution B3-2" hereinafter) was obtained by carrying out polymerization in the same manner as in the second step of Example 1-2, except that 3.0 g of FAAC10 (2H), 1.5 mg of V-65 and 6.0 g of toluene were added to the polymer solution B3-1 in the cylinder. The total degree of polymerization of the process including the first step was 88%.

The resulting polymer solution B3-2 was added dropwise to methanol to allow a copolymer to reprecipitate. Subsequently, the solid matter was vacuum dried at 80° C. for 5 hours to remove a volatile component. The resulting copolymer was analyzed by GPC, and as a result, a unimodal peak was observed. From this result, the resulting copolymer was confirmed to be a diblock copolymer constituted of a BzMA polymer block and a FAAC10 (2H) polymer block (see FIG. 4). Further, by means of $^1$H-NMR analysis, a molecular weight and composition of the fluorine-containing block copolymer were determined (calculation was carried out using a ratio between a 4.3 ppm peak (FAAC10 (2H)) integrated value and a 4.9 ppm peak (BzMA) integrated value).

Example 1-4

(First Step: Polymerization of BzMA)
Polymerization was carried out in the same manner as in the first step of Example 1-3, except that 1.5 g of BzMA, 20 mg of CDSTSP, 1.7 mg of AIBN and 1.5 g of toluene were placed. The degree of polymerization was 99%.

The solution of a polymer of a non-fluorine vinyl-based monomer obtained herein is referred to as a "polymer solution B4-1" hereinafter.

(Second Step: Polymerization of FAAC10(2H))
Polymerization was carried out in the same manner as in the second step of Example 1-3, except that 3.5 g of FAAC10(2H), 1.3 mg of V-65 and 6.0 g of toluene were added to the polymer solution B4-1 in the cylinder. The total degree of polymerization of the process including the first step was 90%.

Comparative Example 1-1

Polymerization was carried out in the same manner as in Example 1-1, except that FAAC4 was used instead of FAAC10(2H).

The degree of polymerization of the first step was 92%, and the total degree of polymerization of the process including the first step was 95%. The resulting copolymer was analyzed by GPC, and as a result, a unimodal peak was observed (see FIG. 2).

Comparative Example 1-2

Polymerization was carried out in the same manner as in Example 1-1, except that FAAC6 was used instead of FAAC10 (2H).
The degree of polymerization of the first step was 95%, and the total degree of polymerization of the process including the first step was 98%. The resulting copolymer was analyzed by GPC, and as a result, a unimodal peak was observed (see FIG. 3).

Example 2-1

(First Step: Polymerization of FAAC10 (2H))
In a Hiper Glass (registered trademark) cylinder having an internal volume of 96 ml (HPG-96, manufactured by Taiatsu Techno Corporation), a magnetic stirrer, 4.0 g of FAAC10 (2H), 0.10 g of CDSTSP, 12.3 mg of V-65 and 2.6 g of MTF were placed. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. After 16 hours, the cylinder was cooled down to room temperature, and the pressure in the cylinder was released to atmospheric pressure to give a solution of a polymer of a fluorine-containing (meth)acrylic ester (referred to as a "polymer solution A1-1" hereinafter). From the solids concentration of the polymer solution, the degree of polymerization proved to be 96%.

(Second Step: Polymerization of Octadecyl Acrylate)
To the polymer solution A1-1 in the cylinder, 1.0 g of octadecyl acrylate, 6.2 mg of V-65, 2.0 g of MTF and 1.0 g of toluene were added. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. for 16 hours. The cylinder was cooled down to room temperature, and the pressure in the cylinder was released to atmospheric pressure. From the solids concentration of the contents, the total degree of polymerization of the process including the first step proved to be 96%. The resulting copolymer was analyzed by GPC, and as a result, a unimodal peak was observed (see FIG. 5).

Example 2-2

(First Step: Polymerization of FAAC10(2H))
Polymerization was carried out in the same manner as in the first step of Example 2-1, except that 2.0 g of FAAC10 (2H), 50 mg of CDSTSP, 6.2 mg of V-65 and 1.3 g of MTF were placed. The degree of polymerization was 98%.
The solution of a polymer of a fluorine-containing (meth)acrylic ester obtained herein is referred to as a "polymer solution A2-1" hereinafter.

(Second Step: Polymerization of Dodecyl Acrylate)
Polymerization was carried out in the same manner as in the second step of Example 2-1, except that 0.5 g of dodecyl acrylate, 3.1 mg of V-65, 1.0 g of MTF and 0.5 g of toluene were added to the polymer solution A2-1 in the cylinder. The total degree of polymerization of the process including the first step was 96%.

Example 2-3

(First Step: Polymerization of FAAC10(2H))
Polymerization was carried out in the same manner as in the first step of Example 2-1, except that 2.0 g of FAAC10 (2H), 50 mg of CDSTSP, 6.2 mg of V-65 and 1.3 g of MTF were placed. The degree of polymerization was 98%.
The solution of a polymer of a fluorine-containing (meth)acrylic ester obtained herein is referred to as a "polymer solution A3-1" hereinafter.

(Second Step: Polymerization of Styrene)
Polymerization was carried out in the same manner as in the second step of Example 2-1, except that 1.0 g of styrene, 2.1 mg of AIBN and 1.5 g of toluene were added to the polymer solution A3-1 in the cylinder and the cylinder was immersed in an oil bath at 80° C. for 16 hours. The total degree of polymerization of the process including the first step was 81%.
The resulting polymer was subjected to reprecipitation and then analyzed by GPC. As a result, a bimodal peak was observed (see FIG. 6). From this result, the copolymer was confirmed to be a mixture of a block copolymer constituted of a FAAC10(2H) polymer block and a styrene polymer block and a small amount of polystyrene.

Comparative Example 2-1

(First Step: Polymerization of FAAC6)
Polymerization was carried out in the same manner as in the first step of Example 2-1, except that FAAC6 was used instead of FAAC10(2H). The degree of polymerization was 99%.

(Second Step: Polymerization of Octadecyl Acrylate)
Polymerization was carried out in the same manner as in the second step of Example 2-1. The total degree of polymerization of the process including the first step was 98%.

Comparative Example 2-2

(First Step: Polymerization of FAAC6)
Polymerization was carried out in the same manner as in the first step of Example 2-3, except that 2.0 g of FAAC6 was used instead of FAAC10 (2H). The degree of polymerization was 97%.

(Second Step: Polymerization of Styrene)
Polymerization was carried out in the same manner as in the second step of Example 2-3. The total degree of polymerization of the process including the first step was 81%.

TABLE 1

| | | Comp. Ex. 1-1 | Comp. Ex. 1-2 | Ex. 1-1 | Ex. 1-2 | Ex. 1-3 | Ex. 1-4 |
|---|---|---|---|---|---|---|---|
| Composition | FAAC4 | 31(58) | — | — | — | — | — |
| of | FAAC6 | — | 21(53) | — | — | — | — |
| copolymer | FAAC10(2H) | — | — | 15(51) | 26(68) | 20(45) | 38(67) |
| (mol % | MMA | 69(42) | 79(47) | 85(49) | 74(32) | — | — |
| (wt %)) | BzMA | — | — | — | — | 80(55) | 62(33) |
| Number-average molecular weight | | 56,000 | 55,000 | 58,000 | 110,000 | 110,000 | 120,000 |

TABLE 1-continued

|  |  | Comp. Ex. 1-1 | Comp. Ex. 1-2 | Ex. 1-1 | Ex. 1-2 | Ex. 1-3 | Ex. 1-4 |
|---|---|---|---|---|---|---|---|
| GPC analysis | Shape of peak | unimodal | unimodal | unimodal | unimodal | unimodal | unimodal |
|  | Number of figure | FIG. 2 | FIG. 3 | FIG. 1 |  | FIG. 4 |  |
| Static contact angle (°) | Pure water | 108 | 112 | 117 | 120 | 122 | 122 |
|  | n-Hexadecane | 67 | 71 | 75 | 73 | 78 | 77 |
| Dynamic contact angle (°) | Pure water | Advancing angle | no sliding | no sliding | 122 | 124 | 122 | 127 |
|  |  | Receding angle |  |  | 95 | 113 | 90 | 108 |
|  |  | Sliding angle |  |  | 24 | 10 | 34 | 12 |
|  | n-Hexadecane | Advancing angle | 74 | 79 | 83 | 78 | 80 | 82 |
|  |  | Receding angle | 41 | 39 | 73 | 73 | 78 | 75 |
|  |  | Sliding angle | 28 | 32 | 8 | 6 | 3 | 6 |

TABLE 2

|  |  | Comp. Ex. 2-1 | Ex. 2-1 | Ex. 2-2 | Comp. Ex. 2-2 | Ex. 2-3 |
|---|---|---|---|---|---|---|
| Composition of copolymer (mol %) (wt %)) | FAAC6 | 74(79) | — | — | 54(83) | — |
|  | FAAC10(2H) | — | 68(79) | 59(78) | — | 44(82) |
|  | SA | 26(21) | 32(21) | — | — | — |
|  | LA | — | — | 41(22) | — | — |
|  | St | — | — | — | 46(17) | 56(19) |
| Number-average molecular weight |  | 23,000 | 20,000 | 20,000 | 18,000 | 21,000 |
| GPC analysis | Shape of peak | unimodal | unimodal | unimodal | bimodal | bimodal |
|  | Number of figure |  | FIG. 5 |  |  | FIG. 6 |
| Static contact angle (°) | Pure water | 113 | 120 | — | 115 | 121 |
|  | n-Hexadecane | 76 | 73 | — | 77 | 76 |
| Dynamic contact angle (°) | Pure water | Advancing angle | 125 | 124 | — | 122 | 128 |
|  |  | Receding angle | 83 | 97 | — | 86 | 100 |
|  |  | Sliding angle | 50 | 23 | — | 43 | 16 |
|  | n-Hexadecane | Advancing angle | 87 | 81 | — | 85 | 86 |
|  |  | Receding angle | 19 | 71 | — | 47 | 72 |
|  |  | Sliding angle | 62 | 11 | — | 54 | 10 |

The invention claimed is:

1. A production process for a fluorine-containing diblock copolymer, being either the following process (A) or the following process (B):

Process (A)
a production process comprising
[first step] a step of polymerizing a fluorine-containing (meth)acrylic ester represented by the following formula (1) in the presence of a trithiocarbonic ester compound and a radical polymerization initiator to give a polymer of the fluorine-containing (meth)acrylic ester, and
[second step] a step of polymerizing a non-fluorine vinyl-based monomer in the presence of the polymer of the fluorine-containing (meth)acrylic ester obtained in the first step to give a fluorine-containing diblock copolymer;

Process (B)
a production process comprising
[first step] a step of polymerizing a non-fluorine vinyl-based monomer in the presence of a trithiocarbonic ester compound and a radical polymerization initiator to give a polymer of the non-fluorine vinyl-based monomer, and
[second step] a step of polymerizing a fluorine-containing (meth)acrylic ester represented by the following formula (1) in the presence of the polymer of the non-fluorine vinyl-based monomer obtained in the first step to give a fluorine-containing diblock copolymer;

[Chem. 1]

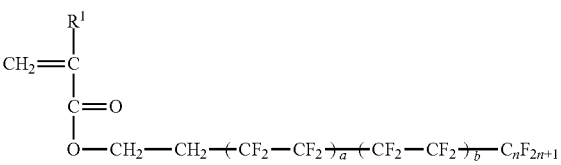

(1)

wherein $R^1$ is a hydrogen atom or a methyl group,
a is an integer of 1 to 3, b is an integer of 1 to 2, n is an integer of 1 to 6,
—$C_nF_{2n+1}$ group is bonded to $CH_2$ group of ($CF_2$ $CH_2$)$_b$— group, and —$(CF_2CF_2)_a$— group is bonded to $CF_2$ group of —$(CF_2CH_2)_b$— group;

wherein the trithiocarbonic ester compound is a compound represented by the following formula (2):

[Chem. 2]

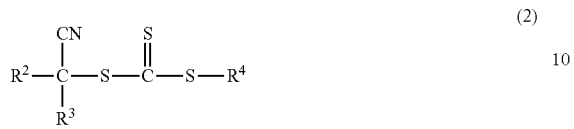

(2)

wherein $R^2$ and $R^3$ are each independently a hydrogen atom or an alkyl group of 1 to 3 carbon atoms, and any one of $R^2$ and $R^3$ may contain one carboxyl group, and $R^4$ is a straight-chain alkyl group of 6 to 18 carbon atoms; and wherein the process (A) and the process (B) are carried out in a borosilicate tempered glass reaction container.

2. The production process as defined in claim 1, wherein the radical polymerization initiator is an azo-based radical polymerization initiator.

3. The production process as defined in claim 1, wherein the fluorine-containing diblock copolymer has a number-average molecular weight of 5,000 to 200,000.

* * * * *